United States Patent
Carlsson et al.

(10) Patent No.: US 6,490,367 B1
(45) Date of Patent: Dec. 3, 2002

(54) ARRANGEMENT AND METHOD FOR A SYSTEM FOR ADMINISTERING CERTIFICATES

(75) Inventors: Jan Carlsson, Uppsala (SE); Per Hoglund, Uppsala (SE); Jesper Skagerberg, Uppsala (SE)

(73) Assignee: Telia AB, Earsta (SE)

( * ) Notice: Subject to any disclaimer, the term of this patent is extended or adjusted under 35 U.S.C. 154(b) by 0 days.

(21) Appl. No.: 08/693,253

(22) PCT Filed: Feb. 9, 1995

(86) PCT No.: PCT/SE95/00128

§ 371 (c)(1),
(2), (4) Date: Oct. 4, 1996

(87) PCT Pub. No.: WO95/22810

PCT Pub. Date: Aug. 24, 1995

(30) Foreign Application Priority Data

Feb. 17, 1994 (SE) ................................................ 9400534

(51) Int. Cl.[7] .................................................. H04Q 1/00
(52) U.S. Cl. ........................ 382/137; 382/115; 382/116; 382/118; 382/119; 340/825.34
(58) Field of Search ................................. 382/115, 116, 382/118, 119; 340/825.34

(56) References Cited

U.S. PATENT DOCUMENTS 5,608,387 A * 3/1997 Davies ........................ 382/118

OTHER PUBLICATIONS

International Journal of Bio–Medical Computing, vol. 35, pp. 147–151, Feb. 1994, Gunnar O. Klein, "Smart Cards–A Security Tool For Health Information Systems".

Advances In Cryptology–AUSCRYPT '90, International Conference on Cryptology, pp. 46–57, Jan. 8–11, 1990, P.J. Lee, "Secure User Access Control for Public networks".

Utlandsrapport Fran Sveriges Tekniska Attacheer, pp. 54–62, Lena Sandh, "NYA Franska Kort Tillaempningar AV IC–KORT".

* cited by examiner

Primary Examiner—Andrew W. Johns
Assistant Examiner—Hiev C. Le
(74) Attorney, Agent, or Firm—Oblon, Spivak, McClelland, Maier & Neustadt, P.C.

(57) ABSTRACT

A system for administering certificates involves the generation, distribution and recall of certificates for public key systems. The generation comprises generating encryption keys and personalizing smart cards. The system is designed as a distributed system and is divided into a central unit with one or more associated terminal units. Each terminal and center is allocated unique certified identities. Mutual checking of access rights and data contents is carried out between the central unit and each terminal unit. An issued certificate can be traced back to the individual responsible for the issuing, compatibility with standards being seen to exist. Personalization of cards is integrated in each terminal.

20 Claims, 7 Drawing Sheets

| 1 | 7 | 13 |
|---|---|----|
| 2 | 8 | 14 |
| 3 | 9 | 15 |
| 4 | 10 | 16 |
| 5 | 11 | 17 |
| 6 | 12 | 18 |

| 1 | 4 | 7 |
|---|---|---|
| 2 | 5 | 8 |
| 3 | 6 | 9 |

ARRANGEMENT AND METHOD FOR A SYSTEM FOR ADMINISTERING CERTIFICATES

BACKGROUND OF THE INVENTION

Field of the Invention

The present invention is intended to be used in contexts which will become apparent from the preambles of the main claims which are attached.

As a result of developments in telecommunications and data communications, an increasing number of sensitive operations are being performed without the participating parties being "present" for a possible check on their identity. A consequence of this is that it must be possible for individuals and parties participating in an operation to be identified "electronically". The methods for doing this up until now have, if they have existed at all, been based on the password technique taken from the espionage trade. During the last few years, the weaknesses of a password technique as the only method of identification have been amply demonstrated by the numerous instances of so-called "hacking".

A method which establishes more secure identification is that of digital signatures, which method can be applied in all the areas where an identification of the source of an operation or a document needs to be verified. This method simulates the normal manner of identification which is used for transactions outside the electronics field. The method using digital signatures is based on the party who is to be identified signing for the transaction (compare ordinary signature on, for example, a contract) and the identity being checked against a comparison original which has the same role as an ID card has for ordinary signatures. For this method to be able to function in an electronics context, an infrastructure needs to be available in order to be able to create electronic identity documents.

The information which we use to verify an ordinary ID card has (as FIG. 1 shows) its equivalent in the electronic identity document. Another definition for electronic identity document is certificate.

An electronic ID document contains additional information which is of no importance for this comparison. It is also possible to add other information, in the same way as a given ID card can contain information specific to a company.

In order to identify an individual with the aid of an ID document, we require that the individual concerned will resemble the person in the photograph and will be able to reproduce the signature. In the case of certificates, this is replaced by a technical procedure based on cryptography which uniquely identifies the user.

The confidence we have in an ID document is really a result of the confidence we have in the organization which issues it, for example a company or an authority, combined with the fact that the document is sufficiently secure in technical terms. As an example of the latter, we can compare the old driving licences, with a photo stuck on and a stamp, with today's licences which are sealed in plastic.

Just as is the case for issuing an ordinary ID document, the issuing of electronic ID documents requires a technical and administrative infrastructure.

Crucial to the quality of any ID document is the identification of the individual which takes place in conjunction with the issuing; this is the absolutely crucial aspect, the quality of which totally determines the quality of the whole document, regardless of whether it is an ordinary ID card or a certificate.

This identification is normally done by the person in question being known, or by some person or persons, already trusted, vouching for the identity. It is obviously preferable if this identification can take place at as "low" a level as possible, for example departmental level in a company, where, by and large, all individuals are known to each other and it is easy to determine who belongs to the organization, with what powers, and in what capacity.

As far as this part of the administration is concerned, there is no great difference between a traditional ID document and a certificate, and in the same way there must be the possibility of verifying that the document is still valid etc.

In the case of certificates, the authority which issues and which may revoke these is usually called a Certification Authority or CA. A difference between certificates and ordinary ID documents is that the holder always carries the latter on his or her person, which need not be the case with certificates; the issuer (CA) also has the role of publishing the electronic ID documents (the certificates) in such a way that these are accessible to anyone requiring access to them. If appropriate, information on revoked certificates may be stored together with the certificates.

As regards the CA (Certification Authority), reference is made to ISO 9594-8 (The Directory Authentication Framework). In the text which follows, we introduce, in the same way as in, for example, Privacy Enhanced mail (RFC 1114), the restriction that the CA is a clearly definable part of an organization.

On the basis of the above, the functions of the CA are defined as follows:

The CA represents an organization or a clearly definable part of such an organization in the issuing of certificates. The CA verifies the identity of the person for whom a certificate is to be created. The CA personalizes a "token" linked to the identified person. By means of this, the CA lets the organization or organization unit guarantee an organizational identity for the person to which a certificate is issued.

The CA represents an organization or a clearly definable part of such an organization in the publication of certificates. The CA makes the certificate known and accessible to anyone, for example through one or more catalogue services.

The CA represents an organization or a clearly definable part of such an organization in the revocation of certificates. The CA discloses, in a reliable manner, that the organization or the organization unit no longer vouches for the previously conferred organization identity.

The CA represents an organization or a clearly definable part of such an organization in the renewal of certificates. The CA extends the validity of the conferred organization identity by issuing a new certificate for this.

SUMMARY OF THE INVENTION

Since the CA always represents an organization or organization unit, the CA, independently of its internal structure, will be regarded by those around it as a unit related to the represented organization or organization unit.

Since the familiarity with the persons involved in an organization is often best at the level where the business is conducted, it is also there that a person can best be identified, both in terms of the physical identity of the person and his or her role in the organization. In larger organizations or organization units, no single authority can be expected to be familiar with the various individuals and their roles in the way which is necessary to be able to guarantee the organization identity of the person.

In consideration of the above, the internal organization of the CA will allow certificates to be issued at the organizational level where the abovementioned familiarity is found.

In the following text it is assumed that the identification procedure is based on the technique using public keys, and that the "token" which is used is an IC card with built-in computing capacity.

In order to issue a certificate, access is needed to the following:

1. A pair of cipher keys unique to the CA, one public and one private, the private one being used for the digital signature which guarantees the identity of the issuer and that the contents of the certificate are not manipulated. The private key must be stored in such a way that unauthorized access is not possible in practice.

2. A terminal where the person carrying out the issuing procedure keys in personal data, a certificate is created and signed (this signature protects against manipulation of the contents in the certificate). For each certificate there is a unique key pair which is linked via the certificate to the individual.

3. A medium where the certificate holder can safely store his private key and carry out the computations necessary during the identification procedure. For this, an IC card is used which offers both secure storage of data and reliable use of the private key for computations.

4. Procedures which make it possible for someone requiring access to certificates to access the latter. This function can be separate from the CA both in technical and administrative terms.

The following security risks can be identified:

False certificates. If there are false certificates in circulation, no one can rely on any certificate issued by this CA.

Manipulation of revocation information. Certificates which are no longer to be valid are not included in revocation lists. Completely legitimate operations will be prevented since the user's certificate will not be accepted by the other party.

Duplication of information. If several individuals have the same organizational identity, no operation or transaction can safely be committed to one particular individual.

The sources of the above risks can be divided into the following separate cases:

An authorized CA operator abuses this trust.

An unauthorized person procures the possibility to operate the CA.

A person succeeds in presenting a false identity at the time when the certificate is issued.

Functional requirements of the CA:

The certificates are issued in accordance with existing security policy.

Each certificate issued is unique.

Supplied certificates. As regards the storage and supply of certificates, it is necessary that the CA be able to place certificates in the keeping of the authority which is supplying these, for example in a catalogue.

The CA will publish revocation lists.

It will be possible for the certification process to be implemented in a decentralized manner in the organization. This is a precondition for satisfying the requirement for rapid processing combined with maximum personal recognition.

Relation between CAs. Each CA is certified by a higher CA, and each CA can in turn certify other CAs.

The CA will be able to function in a "multialgorithm environment" where different certificate structures are used. For example, certificates with structures for DSS and RSA will be able to co-exist.

The CA functionality will as far as possible be built on generally wide-spread and accepted techniques and standards.

Damage limitation. The CA will be designed and administered in such a way that as few valid certificates as possible need to be renewed in order to eliminate false certificates.

Full authentication of operator. Each operator will be identified by a method which at least satisfies the requirements for full authentication as defined in ISO 9594-8.

Complete traceability. When a certificate is issued, it will be possible for all the individuals involved, including the operator, to be identified and traced. All transactions in a CA will be logged securely.

Complete integrity. All information produced by an operator will be protected in such a way that both intentional and unintentional changes to said information will be detected. Program codes and logs will also have protected integrity.

Saved status information. The system will have a sufficiently large amount of information saved so that issuing of certificates with duplicated information cannot arise.

Physically protected environment. It will not be possible to technically manipulate the units involved in such a way that the CA can continue to operate with its functionality apparently intact.

Confidentiality. Sensitive information will be inaccessible to both the operator and to outsiders, for example some terminals may need to be protected against clearing signals.

The invention solves the above set of problems.

SOLUTION

The features which may principally be regarded as characterizing a method and arrangement which solve the problems mentioned above will become apparent from the patent claims attached.

BRIEF DESCRIPTION OF THE DRAWINGS

A presently proposed embodiment of a method and arrangement having the characteristics significant to the invention will be described hereinbelow, reference at the same time being made to the attached drawings, in which.

DISCUSSION OF THE PREFERRED EMBODIMENT

Starting from the requirements for local verification of the certified person's identity and role and for simple administration, and from the security requirements, the architectural requirements can be summarized as follows: Distributed function: it will be possible for a certificate to be requisitioned and briefly personalized at the lowest possible organizational level, and preferably where this certificate is later to be used. A basic consideration is that personal recognition is best at local level.

The number of security-sensitive parts of the system will be minimized, and the distributed solution will not mean that it becomes more difficult and/or more expensive to obtain at least the same system security as with a centralized solution—quite the contrary.

It will be possible for the system to be scaled, and it will also be possible to adapt it in a simple manner to future organizational changes.

The system will be able to administer several different types and codings of certificates.

The system is assumed to have access to one or more external catalogues for distribution of certificates and revocation information. The functioning and interfacing of these are not dealt with at this stage of the project.

Figure 3:
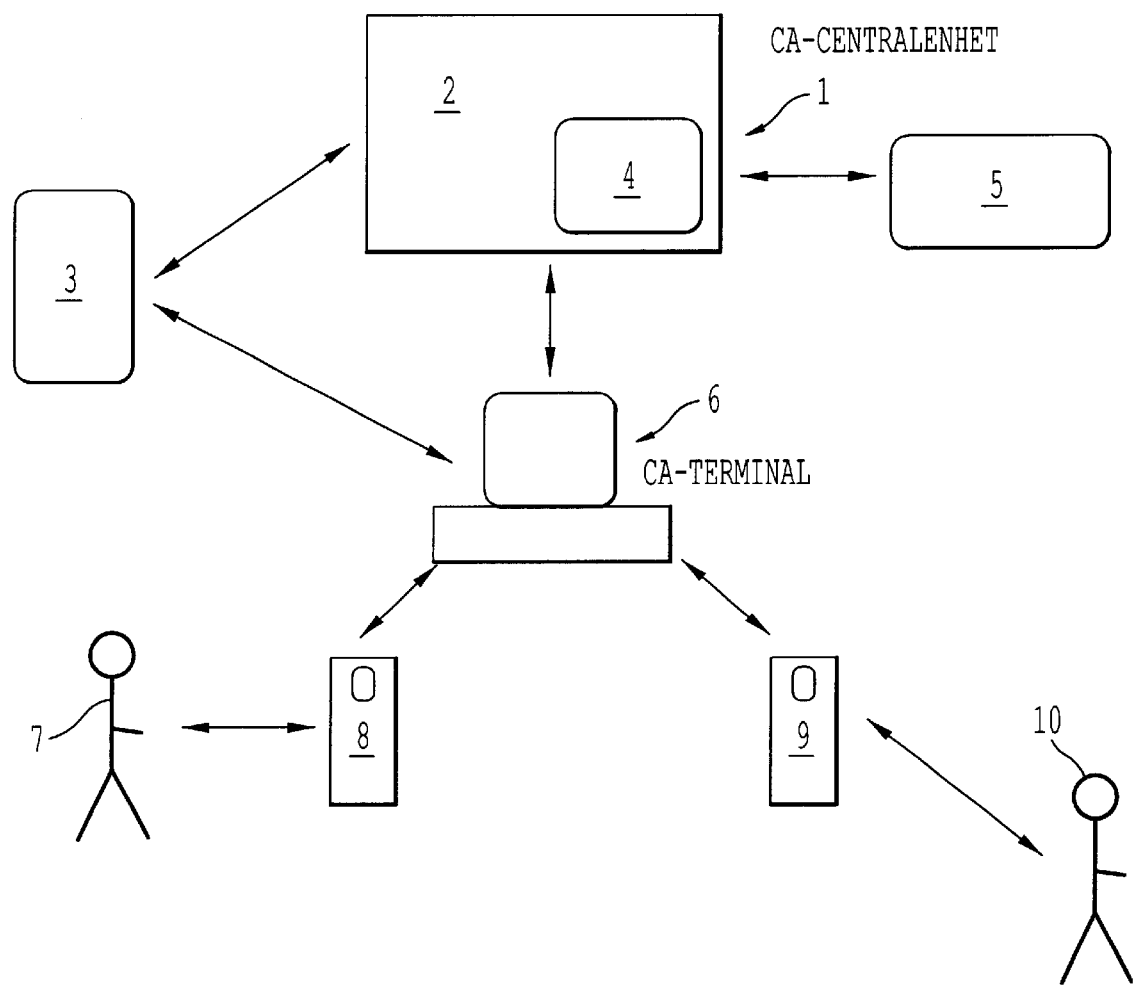
FIG. 3 shows the constructional makeup of the system for administering certificates.

Components which are only required for initializing the system (for example, generating initial keys and certificates) are considered unique to each system implementation and are not dealt with at this stage of the project. Components included are shown in FIG. 3.

The CA central unit represents the central part of the system where CA keys are stored and where verification and signing of the finished certificate take place. A CA central unit will manage to administer one or more CA terminals. A CA central unit can itself accommodate one or more CA identities (i.e. one or more private CA keys). A CA central unit has a system-unique identity.

The CA terminal is the unit where an authorized CA administrator makes a request for a certificate. The CA administrator signs this request and sends it to the central unit. A CA terminal has a system-unique identity and is certified by each CA it serves.

The internal catalogue is used to store system-internal certificate information (for example for CA administrators and CA terminals).

The CA administrator is a person with authorization to issue user certificates at the request of one or more organization units. Each administrator has a unique identity, and this is stored in each certificate which has been created by the administrator.

The card for the CA administrator contains the identity and, if appropriate, certificates and signing and authentication keys for the administrator for which it is issued. Used when the administrator authenticates himself to the system and for signing certificate requests.

The card which is to be personalized is the card which the certified user receives after keys etc. have been written down in the card. The card can be passed on to be presented by the CA administrator.

The different components in the distributed CA have different roles/functions. Depending on whether private keys are to be generated in the CA terminal, CA centre, on the administrator's card or on the new user's card, the roles may vary somewhat.

The tasks of the CA centre are the following:

To authenticate CA terminals. This is done so that the centre will be sure that the terminal is one of the terminals which serve the central unit.

To authenticate CA administrators. Not everyone will be able to act as CA administrator, for which reason authentication is necessary. The function is needed since authentication of the administrator by the CA terminal cannot be checked by the central unit.

To verify certificate data. The CA centre checks the integrity of the certificate data and checks that it has been-created by an authorized administrator by means of verifying the signature of the certificate data.

To check contents of certificate data. The plausibility of the information is checked. The sequence number is compared with previous numbers, and the period of validity of the certificate request is checked.

To create certificate contents. The CA centre assembles certificate data from CA terminal and CA administrator, and also adds information itself.

To sign certificates. The centre signs the certificate contents using one of the private keys. Different keys represent different CA identities.

To create a finished certificate. The CA centre combines the certificate contents and the signature to form a complete certificate.

Communication with CA terminals. The CA centre communicates with several different CA terminals. Since it will be possible for this to take place on completely unprotected lines, the CA centre itself must secure the communication. This is done by means of full authentication, sequence numbers and digital signatures. If the private key is generated in the CA centre, it is necessary to encrypt the communication.

To assemble revocation lists. The CA centre will assemble the revocation messages from the CA terminals. This is done within a defined time interval, for example daily. To send revocation confirmation. The CA centre will send confirmation, stating that a revocation message has been received and that it was correct, to the CA terminal which sent the message. If the revocation message was incorrect, the confirmation will indicate what the error was.

To sign revocation lists. For a revocation list to be valid, it must be signed by the CA centre.

To distribute revocation lists. Revocation lists will be distributed to those requesting them (compare distribution of certificates).

To update the external catalogue. The new certificates will be distributed to the external catalogue or catalogues.

The tasks of the CA terminal are the following:

To authenticate the CA administrator. Not everyone will be able to act as CA administrator, for which reason authentication is necessary.

To handle data input. The CA administrator will be able to input, in a simple manner, the information which is required in order to create, revoke and update a certificate. This can be done using a "form" which the administrator fills in.

To check the plausibility of input information. If the administrator inputs implausible values, the terminal will indicate this and ask for a new value. For security reasons, wrongly input values may need to be logged in some cases.

To create some of the certificate contents. Some information in a certificate is more or less statistical or is given automatically, depending on which administrator is sitting at the terminal. This information is created by the terminal.

To authenticate the CA centre. This is done so that the terminal will be sure that the CA centre is in fact the one expected.

Communication with the CA centre. The CA terminal will communicate with the CA centre. Since it will be possible for this to take place on completely unprotected lines, the CA terminal must itself secure the communication. This is done by means of full authentication, sequence numbers and digital signatures. If the private key is generated in the CA centre, it is necessary to encrypt the communication.

To verify certificates. Before the new certificate is added to the new user's card, the CA terminal will verify the certificate. In this way it is guaranteed that no change has been made to the certificate en route from the centre.

Checking the certificate contents. The terminal checks that the information in the certificate agrees with the information expected.

To personalize a card. The CA terminal itself carries out the personalization of the user's card. This involves the certificate and the private key being added to the card, among other things.

To update the external catalogue. The new certificates will be distributed to the external catalogue or catalogues.

To create revocation messages. The CA terminal will be able to create revocation messages at the request of the CA administrator.

To handle revocation confirmations. The CA terminal will be able to handle revocation confirmations from the CA centre. Three cases may be differentiated here: the revocation confirmation is given as planned, the confirmation indicates that an error has been made, or the confirmation is not given.

To open a blocked card. Many cards have functions for blocking themselves after a certain number of incorrect PIN presentations. The CA terminal will have functions for opening such cards.

To update certificates. The CA terminal will be able to be used to update certificates. In order to do this, it is necessary to have functions for collecting the certificate which is to be updated, functions for changing information and for adding the new certificate to the user's card.

The CA administrator carries out:

Data input. The CA administrator is the one who physically inputs the information which is required in order to create a new certificate, create a revocation message, unlock a blocked card or update a certificate. Before a new certificate is generated, the administrator will check the identity of the user and will verify that he/she is indeed to be certified. In the same way, before a revocation the administrator will check that a user's certificate is indeed to be revoked, etc.

Handles cards. The CA administrator manages the users' cards. This involves issuing new cards, instructing the users how to use their cards, having a store of non-personalized cards, and so forth. In addition, the administrator will make the cards unusable (destroy them) when the stored certificate is revoked.

The user's tasks:

To handle cards. The user is responsible for handling his or her own card. Among other things, this involves following the rules applying to the use of PIN codes, and keeping one's card in a safe place.

Information is created, is protected and flows in the distributed CA architecture. The components in the architecture interact in order together to create the CA function. The arrangement follows the life cycle of a certificate—it is created, changed and dies.

The issuing of certificates proceeds as follows: The first thing which happens is that the CA terminal authenticates the CA administrator. The CA administrator then selects the function "Certification of user" on the CA terminal. If the CA terminal acknowledges the administrator (=successful authentication), a check is made to determine whether there is a connection with the CA centre. If appropriate, a mutual authentication and exchange of session key between CA terminal and CA centre already takes place at this stage. The CA administrator checks that the user is entitled to certification and verifies the user's identity. One of the advantages of the distributed CA architecture is that this stage is easy to administer in a satisfactory manner as regards security. The CA administrator may be reasonably familiar with the users he is to certify, since he/she works with them on a daily basis.

The administrator then uses the CA terminal to complete a form with the user information and validity periods which are required in order to create a certificate. The CA terminal checks the plausibility of the input information and generates an RSA key pair (keys may optionally be generated in the CA terminal, in the CA centre, in the administrator's card or in the user's card). Before certificate data is sent to the CA centre, the certificate data is signed, together with the service life and sequence number of the certificate request, by the administrator (using the administrator's card).

The exchange of information between CA terminal and CA centre is optionally initiated with one or more authentications. The CA centre verifies the integrity of the transmitted certificate data and checks the plausibility/accuracy of the information and adds supplementary information to the certificate data. This information consists, inter alia, of the user's public key (if the centre generates keys).

The finished certificate is signed by the CA centre and sent back to the CA terminal after the centre has checked that the administrator is still in position. The terminal verifies the signature and checks the plausibility and accuracy of the information. The administrator, after checking the information by sight, will give clearance signals to the terminal to proceed with the personalization of the user's card.

The personalization of cards proceeds as follows: It will be possible for a card to be used only when the correct code is presented for it. This code can be left to the user to choose, but this can represent a risk to security since the user likes to choose something associated to himself/herself. Another alternative is to provide a random code which is revealed to the user. When the code is available, the card can be personalized. This involves, among other things, adding the certificate and the user's private key to the card.

Publication of certificates proceeds as follows: After the certificate has been successfully generated and the card personalized, the CA centre and/or CA terminal will publish the new certificate at a place accessible to those wishing to communicate with the new user, for example in some form of catalogue. (The characteristics of the catalogue lie outside this part of the project).

It may be necessary to update a certificate if a user changes name or department, if the company changes name, or if the period of validity of the certificate is to be extended. The CA administrator selects the function "Updating of certificates" on the CA terminal. In practical terms, the procedure is then the same as for the issuing of certificates, with the difference that no keys are generated, the public key already being present in the old certificate. After a certificate has been updated, the new certificate must be distributed and the old one revoked. In addition, the new information must be inserted on the user's card. It will be possible to update several certificates at a time, this in order to deal with reorganizations and name changes.

A certificate is revoked (=declared invalid) when the certificate has become invalidated for some reason. This can occur, for example, when a user has died, has been found to be unreliable, or his/her role has changed. Before the CA administrator revokes a user's certificate, a check will be made according to the administrative rules of the organization.

Following authentication (in the same way as for the issuing of certificates), a signed revocation message is sent to the CA centre. The CA centre verifies the signature of the CA administrator, checks the plausibility of the revocation message, and sends a confirmation back to the terminal. The CA centre assembles a revocation list on the basis of all incoming revocation messages, signs it and distributes the signed list.

Information required for issuing a complete, signed certificate (of type x.509) comes from:

New user and user's card
CA administrator
CA terminal
CA administrator's card
CA centre The new user gives his name and any abbreviation to the CA administrator. This information may already be known to the administrator, but the user should in any case confirm the accuracy of the information. If appropriate, the new user's card may also be used in the generation of certificate data, namely in the case where the user's card will generate its own key pair. The public key which will be included in the certificate then comes from the user's card.

The CA administrator is the one who, at the CA terminal, physically inputs the information required to create a new certificate. This information is input in a form adapted for the information. The information is:

Name of user, and any abbreviation
Department, possibly automatically by CA terminal
Company, possibly automatically by CA terminal
Country, possibly automatically by CA terminal
Period of validity, starting date and expiry date (if appropriate also with clock time)

The CA terminal manages the personal information which is more or less invariable, and the key generation:

Department, the CA administrator will be given the possibility of changing the department name. One possibility is to let the department last entered be a default value.
Company, the CA administrator will be given the possibility of changing the company name. One possibility is to let the company last entered be a default value.
Country, the CA administrator will be given the possibility of changing the country. one possibility is to let the country last entered be a default value.

The user's public key.
The CA administrator's card provides information on:
which CA administrator has created this certificate.
the user's public key (if the CA administrator's card is responsible for key generation).
The CA centre indicates:
which CA has certified the user
which algorithm the certificate is signed with
the user's public key (if the CA centre is responsible for key generation)
the certificate's signature The information required for renewing (updating) a certificate comes from the same sources as for creating the said certificate. The same type of form as for creating the certificate can be used, but the CA terminal presents all old values as default values, after which the administrator changes the fields which are to be updated. These can be, for example, an extended period of validity or the fact that the user has changed department. However, the user's public key will not be changed.

The information which is required in order to create a revocation message comes only from the CA terminal and the CA administrator. The CA administrator enters, on an adapted form, information an which user's certificate is to be revoked. The information required is the user's name, department, company and country. The CA terminal helps with default values.

The CA centre compiles daily a revocation list based on all the revocation messages which have been received during the period.

Figure 4:
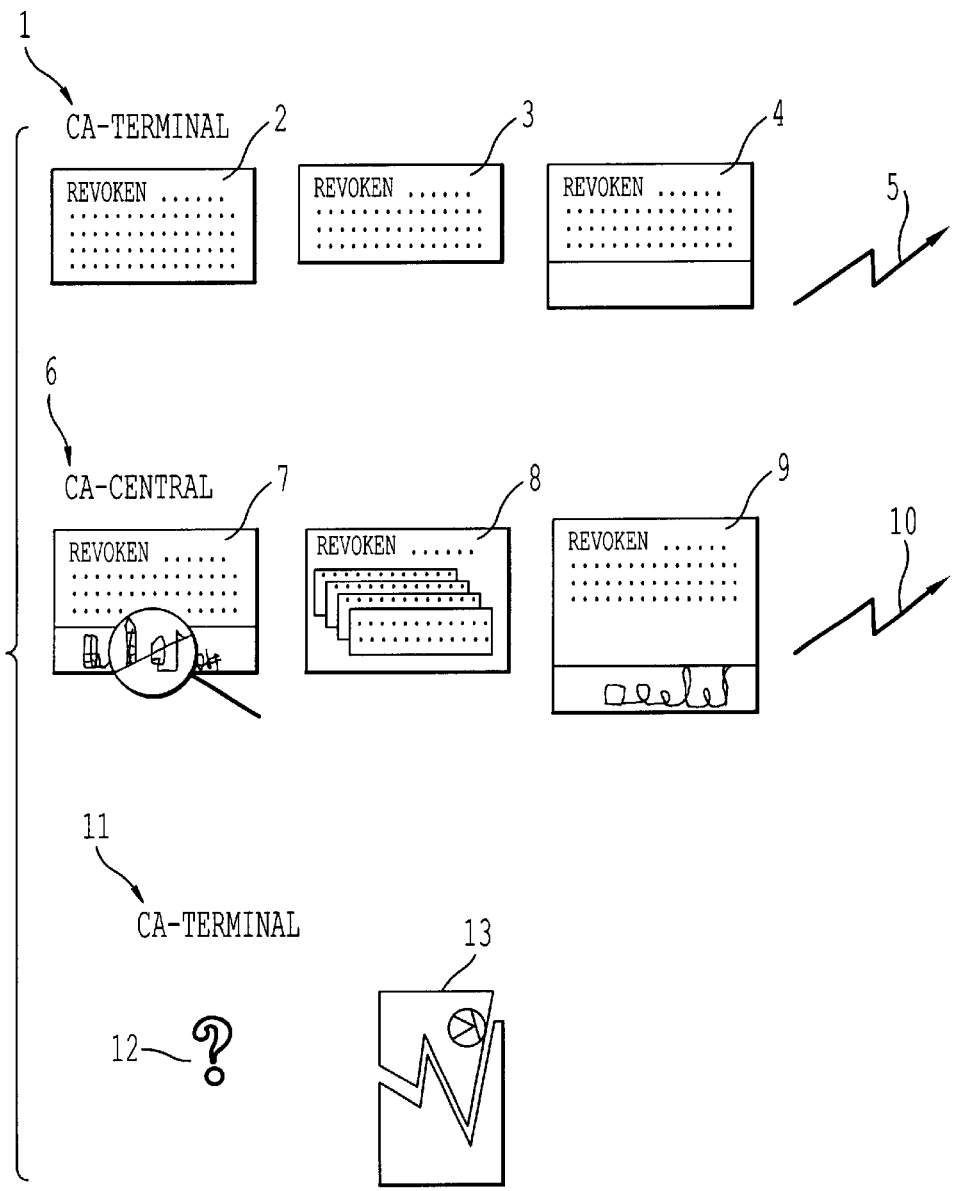
FIG. 4 shows the principle of revocation of certificates.
Figure 4A:
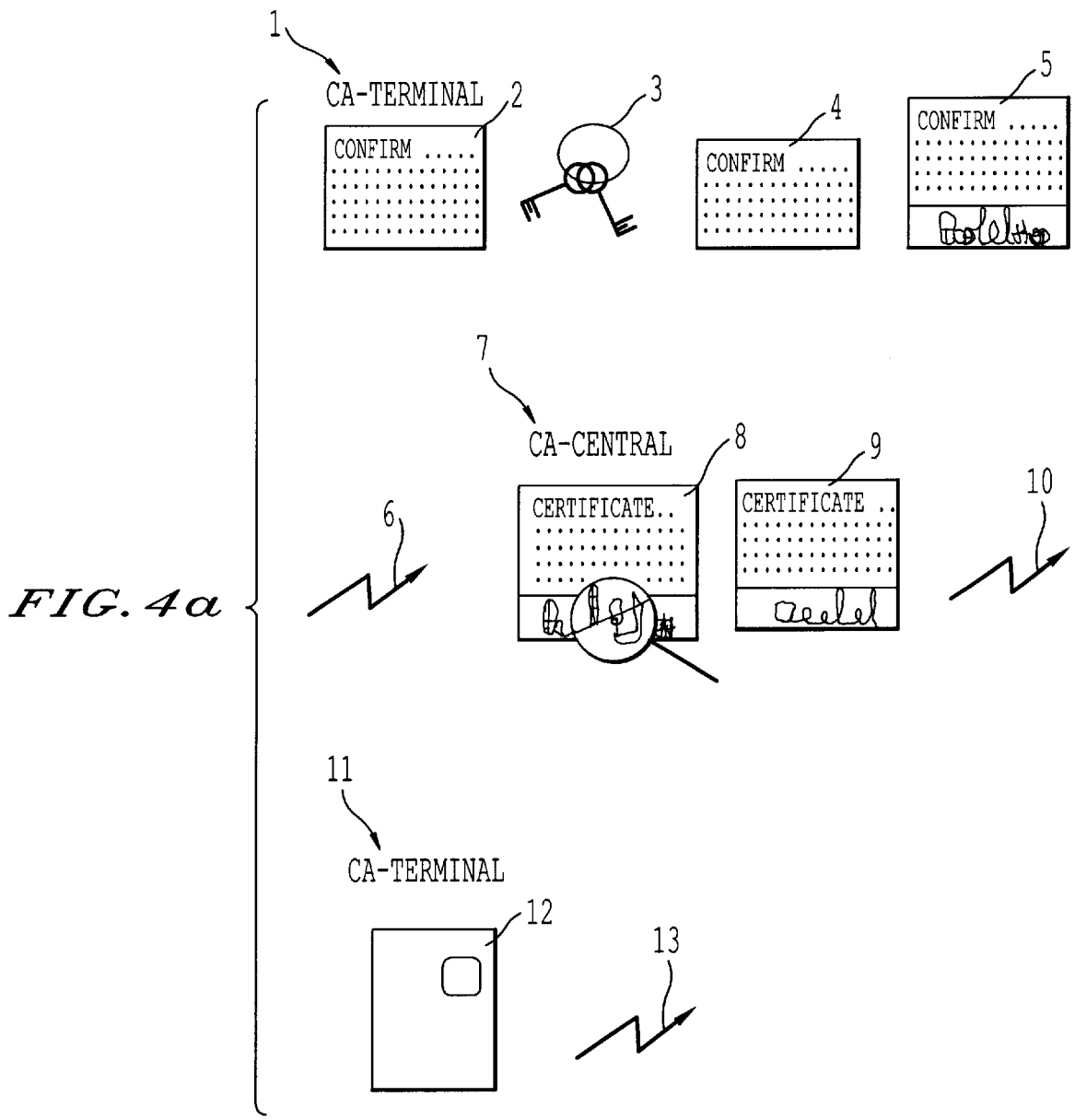

The issuing of a certificate is shown in FIG. 4a.

The updating of a certificate proceeds in the same way as for creating a certificate, with the difference that the CA terminal collects the certificate which is to be updated and presents the old information, and that no keys are generated.

A distributed CA function should not entail any decrease in the security of the system compared with a CA which is physically implemented in one place. A CA located in one and the same place may be easier to make physically secure, for example it is possible to lock in the CA machine and share out the key to the administrators. Nor is it necessary, in the centralized case, to worry about communication, particularly via the public network.

However, as has already been mentioned, the distributed architecture has its points. If the communication is secured and the authentication of participating parties is effected in a satisfactory manner, the distributed CA architecture will instead increase the level of security beyond the level which is obtained with the centralized architecture. This is due to the local personal familiarity of the CA administrator, the reduced risk of certification taking place without a satisfactory check on the identity of the new user.

CA terminal's authentication of CA administrator. The terminal generates a random number which is encrypted on the CA administrator's card using the private authentication key. The CA administrator's certificate is verified, and the encrypted random number is decrypted with the public authentication key in the CA administrator's certificate. If the decrypted random number agrees with the generated number, authentication is successful and the CA terminal can be sure that the CA administrator is who he claims to be.

CA terminal's authentication of CA centre. The CA terminal generates a random number which it encrypts with the CA centre's public authentication key and sends to the CA centre. The CA centre decrypts the random number and sends back the result. The CA terminal authenticates the CA centre by comparing the returned random number with the generated number.

CA centre's authentication of CA terminal. The CA centre generates a random number which is encrypted with the CA terminal's public authentication key. The encrypted number is sent to the CA terminal, which decrypts the number with its private key and returns the result. The CA centre authenticates the CA terminal by comparing the returned number with the generated number.

CA centre's authentication of CA operator. The CA centre generates a random number which is encrypted with the CA operator's public authentication key. The encrypted number is sent via the CA terminal to the CA operator's card for encryption. The result is returned to the CA centre where a comparison is made between the returned number and the generated number.

Administrator's card's authentication of CA terminal (and CA centre). In the cases where cards cannot communicate directly with the administrator (i.e. the typical case), this is done by means of the card's function being blocked until authentication has taken place. For technical reasons, this authentication can be limited to, for example, one "key" associated with the administrator's signing key. In this case, the external entity is not authenticated individually.

The requirements in respect of communication protection which a distributed CA must satisfy are:

Integrity protection

Authentication of communicating parties

Protection against playback (time stamp and sequence number)

Confidentiality, if key generation in CA centre

A dishonest "genuine" administrator can issue genuine certificates whose contents do not comply with the organizational rules on issuing. A dishonest "genuine" administrator can recall certificates for false reasons. It is not possible for just anyone to come forward as an administrator if a card with associated PIN code is required. Note, however, that from the system point of view it is the card which constitutes the administrator. All issuing and recalling of certificates will be logged in a manner which cannot be influenced by the administrator who has handled these.

A corrupted administrator card can sign in someone else's name if the stored key is not associated with the administrator who is in charge of the card. Anyone can issue certificates if the private signing key stored in the card is revealed. This is avoided by means of secure key generation and storage.

A corrupted terminal can make the administrator sign a certificate request or a revocation message with contents other than those shown to the administrator. This is prevented by means of the terminal being physically protected against manipulation of software. The terminal should have as simple a construction as possible and should be without the possibility of program code alteration. The CA centre checks the plausibility of the certificates which are requested to be signed.

If keys are revealed or the program code is manipulated, anyone at all can issue certificates in the organization's name. CA keys and program code are stored in a physically secure manner. The CA terminal and the administrator check the authenticity and plausibility of the data which the CA centre returns after signing.

In the event of infiltration into the communication channel, the accessibility can be destroyed. The communication is cryptographically secured. Key exchange takes place in a cryptographically secured manner.

The CA centre will store one or more private keys, each one having its own specific function. Private keys will be available for signing of certificates, revocation lists and logs, authentication, and for key exchange. If appropriate, one and the same key may be used for several of these functions.

The private keys which represent different CA identities are used for signing of certificates (certification) and revocation lists. It will be possible for different keys to be used for signing of certificates and signing of revocation lists. The keys may under no circumstances be seen outside the CA centre and will have strong integrity protection. The keys will not be used in any contexts other than at the centre. It will be possible to remove and add CA identities. In addition, it will be possible to replace a damaged CA identity with a full copy, and/or give a CA identity a new key pair.

The private authentication key is used when the CA centre authenticates itself to the CA terminals. The key should under no circumstances be seen outside the centre, and it will have strong integrity protection. It will not be possible for the key to be used in any contexts other than at the centre. It will be possible to exchange the authentication key.

The private key for authentication of logs should under no circumstances be seen outside the centre, and it will have strong integrity protection. It will not be possible for the key to be used in any contexts other than at the centre. It will be possible to exchange the key.

The private key for exchange of session keys should under no circumstances be seen outside the centre, and it will have strong integrity protection. It will not be possible for the key to be used in any contexts other than at the centre. It will be possible to exchange the key. (See FIG. 5).

The CA centre will be able to sign the data. This is done by encrypting a hashing sum of data with one of the centre's private keys. It will be possible to use different CA identities (different private keys). It will be possible to use different hashing functions and encryption functions. Here, great importance is placed on the "correct" data being signed and on the correct CA identity being used.

The CA centre will check different input data. This can be, for example, that a certificate request or a revocation message contains plausible information.

The CA centre will log events. The log will be integrity-protected. It will be possible to vary in part the matter which is to be logged. It will of course be possible for log data to be presented/distributed to authorized administrators/operators. The following events will be logged at all times:

when a change is made to what is to be logged security-related events initializing data, data on the centre's components, status, etc.

There will be functions which allow an authorized administrator to make a backup of the log and to renew the storage medium.

The CA centre will have an audit function (function for processing log data). This function will be present at the CA or at another site. The audit function will verify that the centre has created the log.

The information which the centre needs to store is:

internal catalogue logs revocation messages, and revocation lists administrator data information on external catalogues The CA centre will have support in order to manage several different CA entities. Which entity will be used for signing depends on the role of the CA administrator who has sent a certificate request, and possibly also on the terminal from which the request originates. The CA centre will call on the correct CA identity for signing of certificates. The communication will be initiated with a mutual authentication between terminal and centre and authentication of administrator. Exchange of session key also takes place, if necessary.

On initializing of the CA centre, an internal test will be conducted and any errors logged. Serious errors will result in the CA centre not being able to be used by CA terminals. Which errors are considered serious is determined upon manufacture. On initializing, a check will be made on the components included in the centre and on their status. The check results in information in the log. The log will also include the stages which have been carried out in the actual initializing process. It will be possible for the CA centre to be placed in an environment which is relatively unprotected in physical terms. This means that the centre must have a strong physical protection, among other things it will be protected against clearing signals. Unauthorized persons will not be able to "open" the centre and exchange components, alter functions, copy information, etc. The administration of the centre which is necessary (see administration) will only be able to be carried out by authorized persons. The CA centre will authenticate CA administrators and CA terminals. In addition, the centre will authenticate itself to CA terminals. On request, the CA centre will be able to provide a report on the status of the components involved, cf. initializing. The CA centre will be able to verify signatures. The public key which is used for verification will be verified and stored in such a way that it is impossible to alter. The errors which the CA centre will be able to handle are: communication errors, security-related errors and internal errors. When errors occur, these will be logged, if appropriate. Whether the errors are to be logged or not depends on the type of error and the parameters which control the logging. Certain errors can mean that the CA centre is "shut down" and stops functioning. An alarm function will be available which draws the attention of the administrator when errors occur. Security-related errors will be logged at all times. The CA centre will be able to generate keys of different types with variable key length. The keys which are generated are used to protect the communication or are user keys which will be signed. Certificates of CA administrators and of CA terminals will be stored in an internal catalogue. The catalogue will have functions for adding, removing and reading certificates. All certificates in the catalogue will have a unique identity. The CA centre will be able to be administered by an authorized administrator. The administrator must be authenticated before he obtains access to the administrator functions. Three different types of administration may be differentiated: logical, physical, and configuration upon manufacture. Logical administration includes:

data base care/maintenance adding and removing certificates in the internal catalogue indicating what is to be logged obtaining a log printout.

The physical administration is what has to be done on the spot by the administrator:

initiating the centre adding and removing CA identities exchanging the centre's private keys for authentication, key exchange and signing.

When the CA centre is being set up, the algorithms which are to be used for line encryption are determined, among other things. A CA centre will be as simple as possible without compromising security, and the specification is divided into two parts: base functions, and functions for administration and control. The base functions are necessary to ensure that the terminal will be able to execute its tasks securely. Other functions do not need to be implemented physically at the centre, but can be dealt with administratively when setting up and configuring the terminal. The CA terminal will store one or more private keys, each one having its own specific function. There will be private keys both for authentication and for key exchange. If appropriate, one and the same key can be used for both these functions. The private authentication key is used when the CA terminal authenticates itself to the CA centre. The key should under no circumstances be seen outside the terminal, and it will have strong integrity protection. If there is a specific key for authentication, this will not be able to be used for anything other than authentication.

Private key for exchange of session keys. The key should under no circumstances be seen outside the terminal, and it will have strong integrity protection. If there is a specific key for key exchange, this will not be able to be used for anything else.

The CA terminal will support the administrator in the signing of data. This is done by sending data (or a hashing sum of data) to the administrator's card for encryption with his private key. It will be possible to use different hashing functions. Here, great importance is placed on the "correct" data being signed and on the "correct" administrator's card being used. The CA terminal will support the administrator in the signing of data. This is done by sending data (or a hashing sum of data) to the administrator's card for encryption with his private key. It will be possible to use different hashing functions. Here, great importance is placed on the "correct" data being signed and on the "correct" administrator's card being used. The CA terminal will check input data. For example, this can be that the information which the administrator gives is plausible and that the signed certificate from the centre is correct. The CA terminal will be able to communicate securely with the CA centre. This involves protection against alteration, proof of sender, protection against playback, and in some cases also confidentiality protection. The communication will be initiated with a mutual authentication between terminal and centre. Exchange of session key also takes place, if necessary.

It will be possible for the CA terminal to be placed in a physically unprotected environment. This means that the terminal must have strong physical protection. Unauthorized persons will not be able to "open" the terminal and exchange components, alter functions, copy information, etc. The terminal will be protected against clearing signals. This means, among other things, that the slot into which the cards are inserted must be protected. The CA terminal will authenticate CA administrators and the CA centre. In addition, the terminal will authenticate itself to the CA centre. Each terminal will have a unique certified identity and will be able to prove this. The CA terminal will be able to verify signatures. The public key which is used for verification will be verified or stored in such a way that it is impossible to alter. The CA terminal will have functions which allow the administrator to input the data which form the basis of the certificate request, revocation message, updating of certificate and "unlocking of user card". The input will be via some type of form. Certain information in the form is "default" and will be presented by the terminal.

The CA terminal will be able to handle cards and card readers. The CA terminal will report any errors, give instructions and directions to the administrator. The CA terminal will report any errors, give instructions and directions to the administrator. The CA terminal will be able to generate keys of different types with variable key length. The keys which are generated are used to protect the communication or are user keys which will be signed. The errors which the CA terminal will be able to handle are: communication errors, security-related errors and internal errors. When errors occur, these will be reported. Certain errors can mean that the CA terminal is "shut down" and stops functioning. It will be possible for the CA terminal to be configured in different ways. The configuration can only be established in conjunction with the setting-up and consists of:

configuration of terminal's private keys for authentication and key exchange configuration of algorithms for key exchange, encryption of communication, securing of communication, authentication, etc.

terminal's identity introduced (in the form of a private key etc.), each terminal will have its own certified identity.

On initializing of the CA terminal, an internal test will be conducted and any errors reported. Errors will result in the terminal not being put into operation. On initializing, a check will be made on the components involved and on their status. The check results in information in a report. The report will also include the stages which have been carried out in the actual initializing process.

The centre must be set up in a secure environment, and no components or program may be corrupt. After the expiry of a CA centre, components can be reused or destroyed. In addition, the life cycle of the CA centre is described. It is set up, used and dies. Physical and logical administration will be possible during the use of the centre, but it will not be possible for the base components to be altered. After a CA centre's death, components can be reused or the whole centre can be destroyed. In order to achieve this (to have a strong protection at the same time as some administration may be permitted), it is possible to have the CA consist of two parts. One part which contains the hardware and the programs (base components) which are needed for the centre to be able to execute its tasks, and one part which makes it possible physically to administer the centre during operation. The part with base components is given a physical protection which in principle makes it impossible to open the part without it being destroyed (becomes unusable). The part with administrative components will be able to be "opened" by an authorized administrator. This division makes it possible for an administrator to access the administrative components in the centre at the same time as the base components are protected. In order to alter the base components in the protected part, a major operation is required which can only be undertaken by the manufacturer.

The protected part with base components represents the core of the centre. The core has a physically strong protection, and if it is opened, the centre will be made unusable. Only the manufacturer can restore an opened core so that it functions again. The base components consist of:

communication protocol logic control physical control keys/codes which permit use of the CA centre's private keys algorithms for key exchange, encryption of communication, securing of communication, authentication, hashing, etc.

This part of the centre can be "opened" by an authorized administrator. In this part there are:

the different CA entities the centre's private keys for authentication, key exchange and signing.

Since some sensitive components can be removed from the administrative part, these must interact with the base components in such a way that they cannot be used in other contexts. In other words, it will be impossible to use any of the centre's private keys outside the centre. This means that the base components must "unlock" the administrative components before they can be used. Before administration of the administrative components is permitted, an authorized administrator must have authenticated himself to the centre, and if appropriate it is also possible to have the administrator or the administrator's card contain information which is necessary for the centre to be able to be used/initiated.

Figure 8:
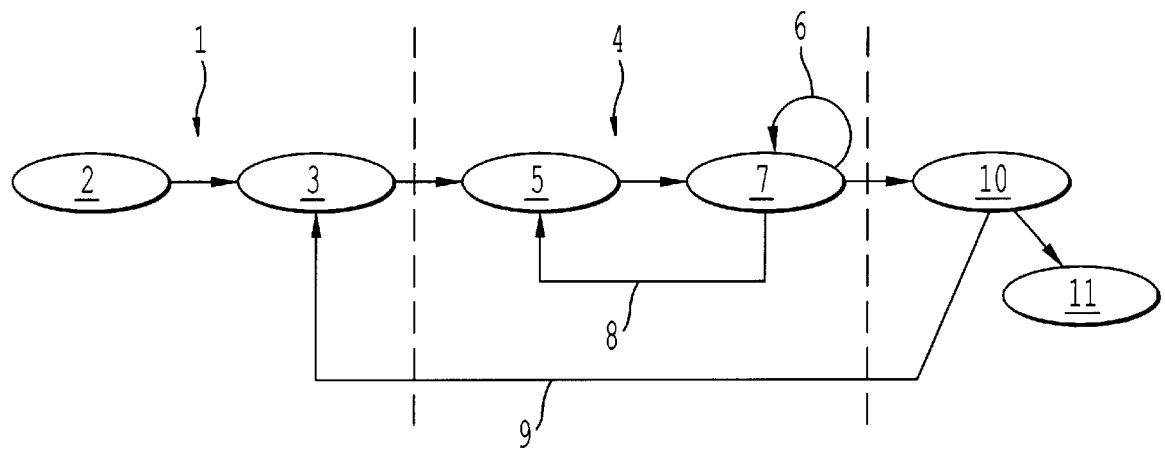
FIG. 8 shows the basic structure in association with the administration system.
Figure 9:
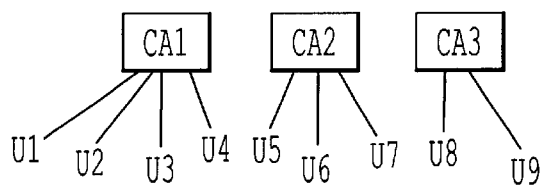
FIG. 9 shows interaction in the system.
Figure 10:
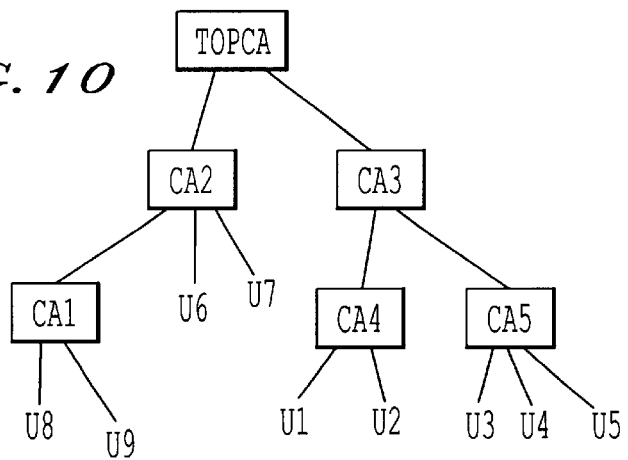
FIG. 10 shows the distribution concept in the system.

FIG. 8 describes the various states in which a CA centre finds itself during its lifetime. This section summarizes the management undertaken during the lifetime of a centre: configuration, initiation, logical and physical administration and physical destruction. The CA centre will be set up in a secure environment with components which are free from error and inspected (not corrupt); the components do not contain any secret information, but they must be integrity-protected. This is a sensitive period in the lifetime of a centre, trust must be complete in the people/processes involved in the setting-up. The organization which sets up CA centres should be certified in accordance with certain criteria.

The components which are used should also be certified/ inspected. During setting-up, the following base components are introduced:

communication protocol logic control physical control.

After setting-up, the centre will be configured. This can be seen as a part of the setting-up and is carried out at the same place, but some information in the configuration components is sensitive and will be kept secret.

During configuration, functions, algorithms and data which are less statistical in nature are implemented. The aim of this division is to be open to the developments taking place in the field of encryption. It may be that algorithms prove weak, key lengths become insufficient, etc. During configuration, the following components are introduced:

keys/codes which permit use of the CA centre's private keys algorithms for key exchange, encryption of communication, securing of communication, authentication, etc.

The configuration is completed with the base components being given a physical protection and with initializing and operation being permitted. Initializing will only be able to be carried out by an authorized person. During initialization, an internal test is carried out and any errors reported. Serious errors will result in the CA centre not being able to be used. During initialization, a check will be made on the components included in the centre and on their status. The check results in information in the log. The log will also include the stages which have been carried out in the actual initializing process. Initializing is also carried out after the centre has been physically administered. During initializing, three cases can be differentiated:

a new "Top" CA is initialized, here the CA centre will itself generate its identity an empty, new CA will acquire an existing identity, this will take place, for example, when this CA is certified by another CA at a higher level a CA is restarted after, for example, physical administration, a CA which is not empty will not be able to obtain a new identity.

During operation, it will be possible for the CA centre to be administered by an authorized administrator. The administrator must be authenticated before he obtains access to the administrator functions. During operation, two types of administration can be carried out: logical and physical. Logical administration includes:

data base care/maintenance adding and removing certificates in the internal catalogue indicating what is to be logged obtaining a log printout The physical administration is what has to be done on the spot by the administrator:

initiating the centre adding and removing CA identities exchanging the centre's private keys for authentication, key exchange and signing.

A CA centre dies when someone attempts to access the base components. A dead CA centre cannot be used for anything, except for obtaining the log. There are two reasons why a CA centre dies: an unauthorized person attempts to access the base components, or an unauthorized person opens the centre in order to re-configure the centre. The administrative components in a dead CA centre are reused in the new configuration or are destroyed. In order to prevent administrative components in a dead CA centre from being used by an unauthorized person, these components will be destroyed. The base components do not need to be destroyed.

Although the distributed CA architecture essentially describes a CA which acts freely and independently of other CAs, it is possible in a simple way to make the CA cooperate with other CA domains. This means that users are not restricted to their own CA domain. The method or methods used to communicate between different CA domains can differ somewhat. Either there is a flat CA structure in which each CA in the different domains is its own master, or there is a hierarchy of CAs. The flat structure has the advantage that all security administration can take place within one's own domain, independently of a higher authority. No trust needs to be established, no agreements need to be drawn up. One is one's own master. The disadvantage of the flat CA structure is that cross certificates are required (see below) for inter-domain communication. As the number of domains increases, the number of cross certificates will increase exponentially; for a new domain number n+1, two new cross certificates are needed (cf. distribution of symmetrical keys). The simple key administration which otherwise characterizes public key systems is destroyed in this way. In addition, creating cross certificates is an operation which must be carried out safely, otherwise it represents a risk to security.

In a flat structure, the interaction between different CA domains is obtained with a cross certificate, by means of which the one CA certifies the other. A cross certificate is in principle the same as a user certificate, with the difference that the public key already exists and will not be generated. In order to obtain a cross certificate, some extra functionality is required in the CA terminal or in the centre. What is important in cross-certification is that the correct public key is signed. This must be solved by an administrative method, since the public key cannot be verified in the normal way. No cross certificates are needed in a CA hierarchy, since each CA therein is certified by a CA at the level above. The CA at the top certifies itself under strict control. The advantages of a CA hierarchy are that it is simple to break up certificate chains and that the number of certifications of CAs increases linearly instead of exponentially. Since the different CA domains do not certify each other reciprocally, there must be a general policy on how, among other things, certification will take place. This can be seen both as a disadvantage (different domains perhaps have and wish to keep different policies), but also as an advantage, since there are clear instructions and these are mutual. One problem with a CA hierarchy is the slowness, the checking and the standardizing which are necessary for introducing such a hierarchy, and it is particularly difficult to find a suitable authority which is able and willing to act as the TOPCA. In addition, this authority must be accepted by all the domains involved. It will be possible for the distributed CA to be used in a CA hierarchy. It can be the TOPCA by virtue of the fact that it generates its own identity when initiating takes place with an empty CA, it can be a CA at any other level since initiation with existing identity is permitted, and it can certify another CA in the same way as when certifying users.

KEY TO FIGURES

FIG. 1

1 CERTIFICATE

2 Uppsala County Administration 3 valid from 4 valid to

5 Lena Andersson's public key

6 Digital signature generated by issuer

7 Plastic covering, appearance =recognition

FIG. 2

A. To issue a certificate

1 The person who is to obtain a certificate identifies himself or herself using, for example, an identification card with a photograph.

2 A terminal with card reader is used to introduce the information which is required in the certificate.

3 A key pair unique to the certificate holder is created and stored in the terminal.

4 The private key is stored in an IC card completely protected against access and is erased from the terminal. Since encryption can be carried out in the card, the key need never leave the latter.

5 The public key is stored as part of the certificate, this is open and accessible to all.

B. Certificate Catalouge

FIG. 3

1 CA central unit

2 One or more CA keys

3 External catalogue

4 Internal catalogue

5 Possible additional CA terminals

6 CA terminal

7 CA administrator

8 Token for CA administrator

9 Token to be personalized

10 User to be certified

Figure 1:
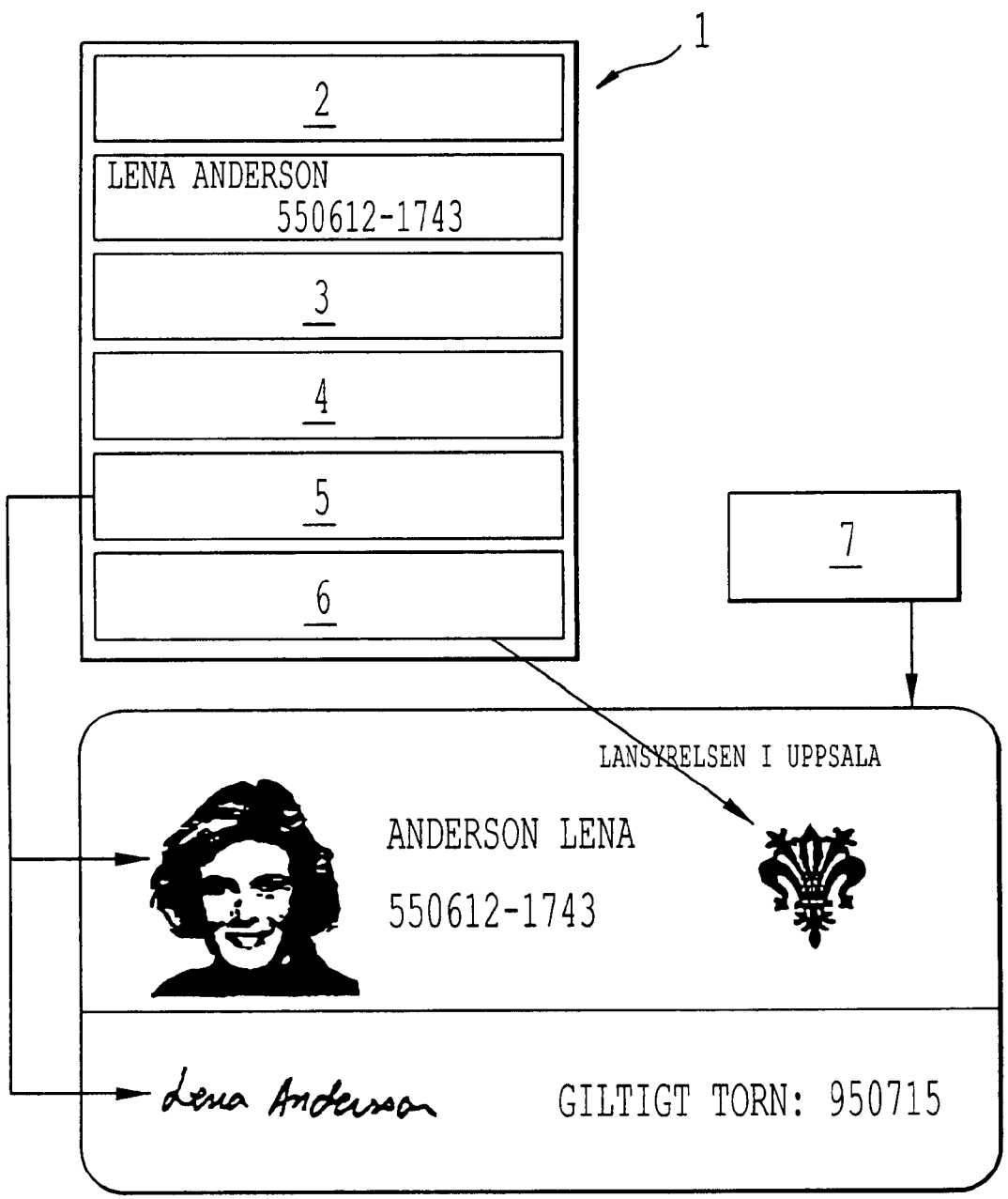
FIG. 1 shows a certificate.
Figure 2:
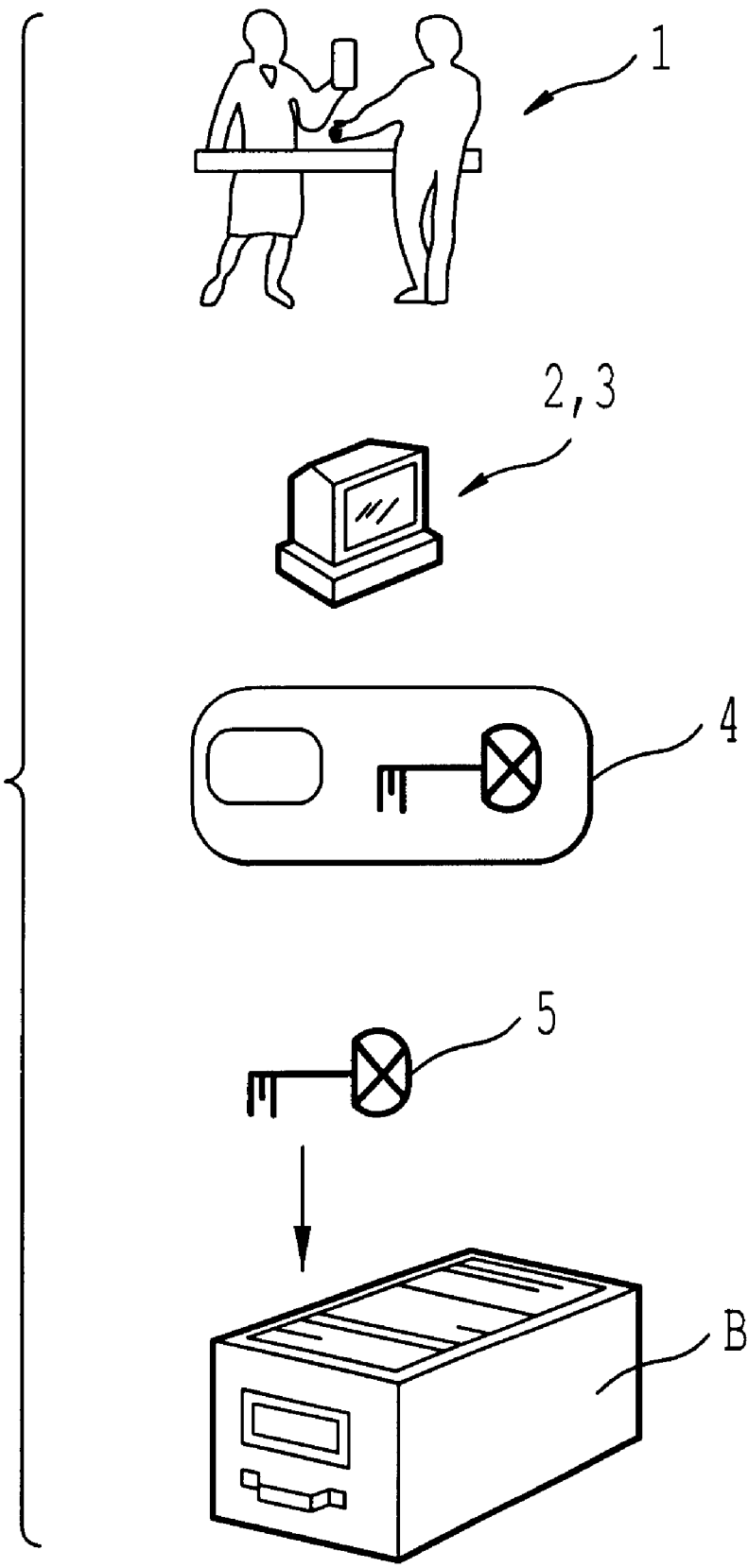
FIG. 2 shows the administration of a certificate.

FIG. 4
1. CA terminal
2. The CA administrator indicates which certificate is to be revoked
3. ... and the CA terminal draws up a revocation message
4. ... which is signed by the CA administrator
5. ... and sent to the CA centre via the public network.
6. CA centre
7. The CA centre verifies the signature and sends a confirmation to the terminal.
8. The centre periodically creates a revocation list of the revocation messages ...
9. ... signs the list ...
10. ... and distributes it to all the authorities concerned.
11. CA terminal
12. The CA terminal presents the confirmation to the administrator...
13. ... who makes the card unusable.

FIG. 4a
1. CA terminal
2. The CA administrator fills in a certificate form...
3. ... after checking the input information, the terminal generates a key pair ...
4. ... and formats the information and public key to certificate data.
5. The certificate data is signed by the CA administrator ...
6. ... and sent to the CA centre via the public network.
7. CA centre
8. The CA centre verifies the signature ...
9. adds supplementary information, formats and signs the certificate ...
10. ... and sends the finished certificate back to the CA terminal ...
11. CA terminal
12. ... where the card is finally personalized.
13. If the personalization succeeds, the new certificate is distributed to the external catalogue.

Figures 5, 6, 7:
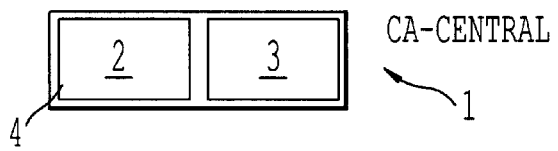
FIG. 5 shows a table of keys and use areas.
FIG. 6 shows another table of private keys and the use areas.
FIG. 7 shows a CA centre.

FIG. 5
1. Private key
2. The various certification keys which represent CA identity O-N
3. The various revocation keys which represent CA identity O-N
4. Authentication key
5. Log signing
6. Exchange of session keys
7. Area of use
8. Signs user certificate
9. Signs revocation lists
10. Authentication to CA terminals
11. Signing of logs
12. Encryption of session keys
13. Application
14. Certifying new user
15. Compiling revocation lists
16. Communicating with terminals
17. Adding log data to log
18. Initially, when there is a need for subsequent communication to be encrypted.

FIG. 6
1. Private key
2. Authentication key
3. Exchange of session keys
4. Area of use
5. Authentication to the CA centre
6. Encryption of session keys
7. Application
8. Communicating with centre
9. Initially, when there is a need for subseguent information to be encrypted.

FIG. 7
1. CA centre
2. Base components
4. Administrative components
5. Component destruction protection FIG. 8
1. Set-up, secure environment
2. set-up
3. Hardware configuration
4. Operation, relatively insecure environment
5. Initialization
6. Logic administration
7. Operation
8. Phsysical administration
9. Re-use
10. Death
11. Physical destruction

What is claimed is:

1. A method of issuing certificates having a unique digital signature identifying a certification authority responsible for the issuing, comprising;
  providing a distributed system divided into a central unit and one or more associated terminal unit;
  providing each associated terminal unit and the central unit with unique identities;
  processing certificates as authorized by a certification authority at one of the associated terminal units or the central unit by mutual checking of access rights and data contents between the central unit and each associated terminal unit; and
  issuing each certificate so that it has encoded therein access authority for the certificate user designated along with a unique digital signature identifying the certification authority responsible for issuing the certificate.

2. A distributed system configured to carry out the method according to claim 1.

3. The system according to claim 2, wherein the certificates each include a smart card.

4. The system according to claim 2, wherein the certification authority publishes revocation lists terminating previously issued certificates and wherein the certification authority is made up of different certificate issuers, each certificate issuer having a unique digital signature and being certified by a higher ranking authority and each certificate issuer being able to certify other lower ranking certificate issuers.

5. The system according to claim 2, wherein the certification authority is configured to function in a multialgorithm enviornment in which different certificate encryption algorithms can be used.

6. The system according to claim 2, wherein the associated terminal unit or the central unit including the certification authority further includes means for logging all transactions involved in issuing the certificate and means for uniquely identifying each operator and encoding unique operator identify into each issued certificate so as to make it possible to identify and trace all operators involved in all the transactions.

7. The system according to claim 6, further including means for detecting all information produced by an operator and for protecting the information from intentional and unintentional changing and means for protecting program codes and logs.

8. The system according to claim 2, comprising a storage device configured to hold a sufficiently great amount of stored information so that issuing of certificates with duplicated information cannot arise and means keeping sensitive information inaccessible to any operator and any outsiders.

9. The system according to claim 2, wherein the system is scalable and adaptable to future organization changes and the system includes means for handling several different types of codes and certificates.

10. The system according to claim 2, wherein there are one or more external catalogues for distribution of certificates and revocation information for terminating certificates and further including means for initializing the system by generating initial keys and means for ensuring that issued certificates are unique to each system configuration.

11. The system according to claim 2, wherein the central unit includes the certification authority provided as one or more certification authority administrator terminals having private keys providing a system-unique certification authority administrator terminal identity as the unique digital signature.

12. The system according to claim 2, wherein each associated terminal unit includes a certification authority administrator acting as the certification authority with a system-unique identity functioning as the unique digital signature.

13. The system according to claim 2, further including an internal catalogue configured to store system-internal certificate information relative to certification authority administrators acting as the certification authority issuing certificates at the request of one or more organization units, where each certification authority administrator has a unique identity and this is stored in each certificate which is created by the certification authority administrator as the unique digital signature.

14. The system according to claim 13, wherein each certificate is delivered to an authorized user by the certification authority administrator.

15. The system according to claim 2, wherein the central unit includes means for ensuring that any terminal unit communicating with the central unit is an associated terminal unit which is authorized to communicate with the central unit, means for authenticating one of a group of certification authority administrators as the certification authority for issuing each certificate, means for verifying certificate data, means for checking integrity of certificate data and that the certificate data has been created by an authorized certification authority administrator, means for checking contents and plausibility of the certificate data, means for comparing a sequence certificate number with previous certificate numbers, means for checking a period of validity for the certificate request, means for compiling certificate data from the associated terminal unit, the certification authority administrator, and information added by the central unit to issue a certificate, where the central unit communicates with different associated terminal units on completely unprotected lines, the central unit having means for providing secure communications on said unprotected lines.

16. The system according to claim 2, wherein each associated terminal unit includes means for authenticating a certification authority administrator as the certification authority, means for handling input data, means for checking the plausibility of the input data, means for creating part of the certificate contents, means for authenticating the central unit, means for communicating with the central unit, means for verifying certificates, means for checking the certificate contents, means for personalizing the certificates for individual users, means for updating external catalogues, means for creating revocation messages to terminate issued certificates, means for handling revocation confirmations, means for opening any blocked certificate, and means for updating certificates.

17. The system according to claim 2, wherein the certification authority includes an administrator and is configured to provide physical input of data required to issue a certificate, to create a revocation message, to unlock a blocked certificate, to update a certificate, and to make certificates unusable when the certificate is revoked.

18. The system according claim 2, wherein the certificates include PIN codes.

19. The system according to claim 3, wherein the certificate authority publishes revocation lists terminating previously issued certificates and wherein the certificate authority is made up of different certificate issuers, each certificate issuer having a different unique digital signature and being certified by a higher ranking authority and each certificate issuer being able to certify other lower ranking certificate issuers.

20. The system according to claim 3 wherein the certification authority is configured to function in a multialgorithm environment in which different certificate encryption algorithms can be used.

* * * * *